United States Patent [19]

Vanderplow

[11] Patent Number: 4,885,866
[45] Date of Patent: Dec. 12, 1989

[54] SPOON AND MOUNT

[76] Inventor: Allen P. Vanderplow, 5712 Glenwood Dr., Racine, Wis. 53406

[21] Appl. No.: 204,903

[22] Filed: Jun. 10, 1988

[51] Int. Cl.⁴ ............................................. A01K 85/00
[52] U.S. Cl. ..................................................... 43/42.19
[58] Field of Search .................. 43/42.09, 42.19, 42.20, 43/42.21, 43.12

[56] References Cited

U.S. PATENT DOCUMENTS

| | | | |
|---|---|---|---|
| 1,467,116 | 9/1923 | Reefers | 43/42.19 |
| 1,678,448 | 7/1928 | Sharron | 43/42.19 |
| 2,272,710 | 2/1942 | Hoover | 43/42.19 |
| 2,674,823 | 4/1954 | Gellings | 43/42.19 |
| 3,466,786 | 9/1969 | Lewis | 43/42.19 |
| 3,488,877 | 1/1970 | Caranasse | 43/43.09 |
| 4,090,319 | 5/1978 | Wolfe | 43/42.19 |
| 4,730,410 | 3/1988 | Sobieniak | 43/42.19 |

Primary Examiner—M. Jordan
Attorney, Agent, or Firm—Peter N. Jansson, Ltd.

[57] ABSTRACT

Improved fishing lure apparatus including a spoon with a mounting hole and a substantially rigid attachment loop extending loosely therethrough. The interengaging portions of the spoon mounting hole and/or attachment loop have non-circular shaping which focuses the engagement of the loop and mounting hole toward the centerpoint of the leading edge of the mounting hole as the lure apparatus is drawn through water. Some embodiments include a gap in the leading edge which allows easy spoon removal. A spindle-mounted tube and clevis dimensioned facilitate connection and disconnection of the spoon and clevis.

14 Claims, 4 Drawing Sheets

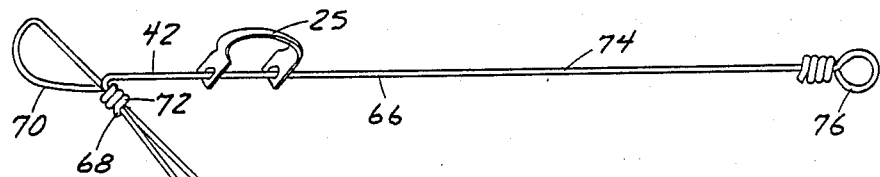
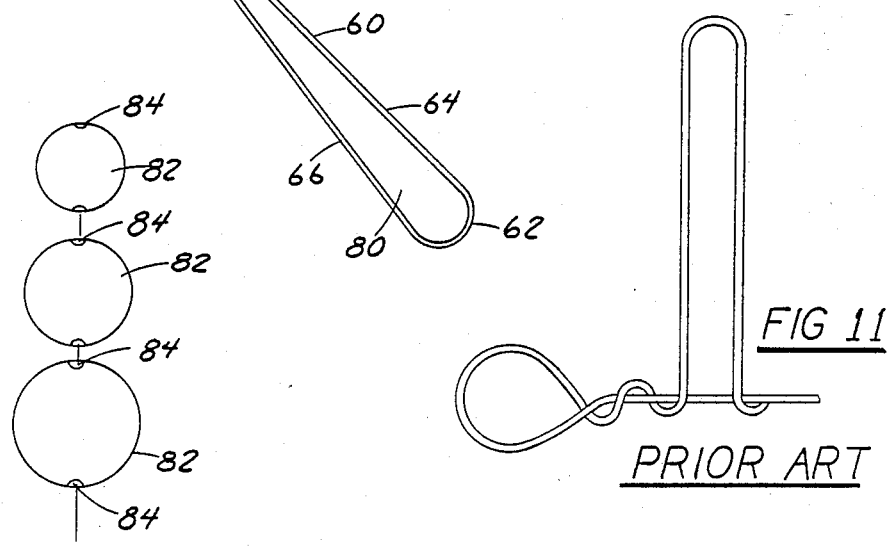
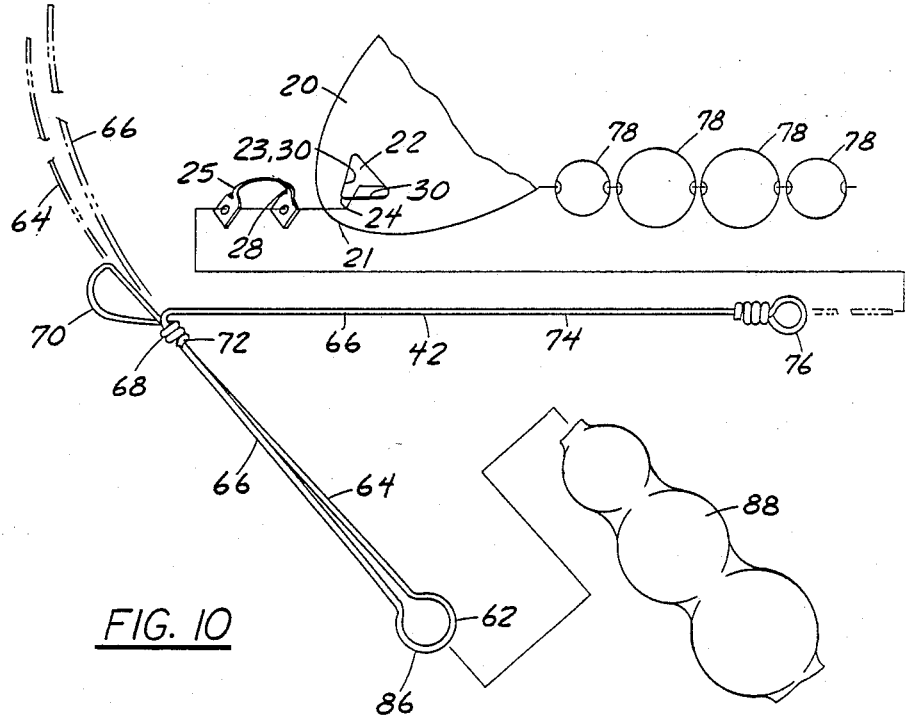
FIG. 9
FIG. 11
PRIOR ART
FIG. 10

SPOON AND MOUNT

FIELD OF THE INVENTION

This invention is related generally to fishing lure apparatus and, more particularly, to spoons and the mounting thereof with the fishing lure apparatus.

BACKGROUND OF THE INVENTION

In the field of fishing lure apparatus, spoons are used as important fish-attacting components of lure apparatus or as the major component. The term "spoon" is used because of the slightly hollowed or cupped shape which characterizes such devices. Spoons are used either in casting or trolling, to attract and catch fish.

A great many kinds of spoons and mounting mechanisms for spoons have been made in a variety of shapes and sizes. When a spoon is the principal component of the lure, it typically flutters and may spin or revolve about an axis which extends along the length of the spoon. When used as an important, but not the principal, fish-attacting component of a lure having other fish-attracting components, a spoon revolves around a principal axis (a spindle or an imaginary line). In the latter case, the spoon is often referred to as a spinner. As used herein, the term "spoon" refers to both sorts of uses unless the context or surrounding structure dictates one specific use.

Referring to spinners, the spoon is attached to the spindle, typically a wire extending along the principal axis of the lure, in a manner allowing it to revolve or spin about the spindle as the lure is pulled through the water. More specifically, the attachment of the spoon to the spindle is made by inserting an attachment loop, preferably a U-shaped article called a clevis, through a mounting hole near the front end of the spoon. The clevis or other attachment loop is rotatably secured to the spindle.

The mounting holes of spoons of the prior art are typically round, and serve only for attachment purposes. The clevis or other attachment loop extends freely through such mounting holes. Attachment of a spoon onto the clevis or other attachment loop often requires the use of hand tools. The process of changing a spoon may be somewhat time-consuming and inconvenient.

Referring to the connection of the clevis to the spindle, the clevis typically has first and second parallel leg portions with terminal structures at their ends having holes which rotatably receive the spindle. It is known in the art that the holes in the U-shaped clevis should be large enough to allow the spoon and clevis to rotate freely about the spindle, but not so large as to allow undue wobbling. The spoon rotates freely about the spindle as it is pulled through the water on the clevis (or other attachment loop). The spoon is held and drawn only by the clevis or other attachment loop.

Rotation of the spoon about the spindle as the lure is drawn through the water has a natural tendency to rotate the entire lure, causing twisting of the fishing line to which the lure is attached. This line twisting is very objectionable, especially when light monofilament line is used. Line twisting can become so severe that it can tangle the line on the reel holding such line, ruining any attempt to cast the lure.

Much effort has been expended to develop simple and effective ways to eliminate or reduce the line twist problem. Attachment of the spoon to a U-shaped clevis as described above reduces line twist problems to some extent by permitting the spoon to rotate more freely about the spindle than when other sorts of attachment loops or mechanisms are used. However, frictional forces between the clevis and spindle are still large enough to cause the entire lure to revolve and twist the line. Other ways of attaching the spoon, such as the use of swivel connectors, have been tried, but with only partial success. And, it has been found that some swivel connectors tend to destroy the vibrating, wobbling action of the lure, rendering it less effective for attracting and catching fish.

While much work has been directed at the problem of line twisting, little work has been done in the prior art on the causes and effects of spoon wobble. There is a well-recognized need, however, to provide improved fishing lure apparatus which reduces or overcomes line twist problems. There is a also a need for improved spoons and spoon mounts.

OBJECTS OF THE INVENTION

It is an object of this invention to provide an improved fishing lure apparatus overcoming some of the problems and shortcomings of the prior art.

Another object of this invention is to provide fishing lure apparatus with a reduced line twisting tendency.

Another object of this invention is to provide a spoon and spoon mount exhibiting improved fish-attacting characteristics.

Another object of this invention is to provide an improved spoon and mount which facilitates connection of the spoon with a clevis or other attachment loop.

Another object of this invention is to provide a spoon which may be connected and disconnected without the use of tools.

Another object of this invention is to provide fishing lure apparatus with a spoon the rotation of which has improved control.

These and other important objects will be apparent from the descriptions of this invention which follow.

SUMMARY OF THE INVENTION

The invention is an improved fishing lure apparatus which overcomes certain problems and shortcomings of the prior art. More specifically, this invention is an improved form of the engagement of spoons with rigid attachment loops which provides significant operational advantages.

It is believed that the extent of spoon wobbling is a factor in causing line twisting and the consequent line twist problems. That is, greater and more erratic wobbling of the spoon promotes line twist problems, while a more controlled, less erratic wobbling reduces line twist problems.

This invention is based in part not only on this understanding, but on the discovery that the physical interaction of the mounting hole of the spoon and the clevis or other attachment loop extending through such mounting hole has a significant effect on the actions of the spoon as it is pulled through the water. Thus, spoon wobble can occur not only due to looseness in the connection of the clevis to the spindle, but also by virtue of the relationship of the clevis (or other attachment loop) to the spoon.

Describing the physical characteristics of the spoon and attachment loop which are characteristic of this invention requires an initial description of the parts of spoons and attachment loops in general. Spoons, of course, have a front end with a mounting hole near it. As in any fishing spoon, the mounting hole has a leading edge portion with a centerpoint toward the front end of the spoon. A substantially rigid attachment loop extends loosely through the mounting hole and has an inner edge with a spoon-engagement portion. The spoon is pulled through the water by sole means of the attachment loop, and the spoon vibrates and flutters on the loop as this occurs. The clevis or other attachment loop may be rotatably mounted on a spindle (typically, on a spindle wire), or an attachment loop such as a split ring may be secured to a spin bearing. Either way, the spoon is free to rotate as it is pulled through the water.

As noted, this invention is based in part on recognition that the characteristics of the vibration and flutter of the spoon as it moves through the water are affected by the relationship of the mounting hole and attachment loop. As the apparatus is pulled through the water, the leading edge portion of the mounting hole in the spoon and the spoon-engagement portion of the attachment loop inner edge are, of course, the primary contact portions of the spoon and loop.

More specifically, it has been found that the round mounting hole in spoons of the prior art have a tendency to cause or permit unacceptably erratic wobbling of the spoon on the clevis or other attachment loop. The leading edge portion of the mounting hole and the spoon-engagement portion of the attachment loop inner edge do not allow a firm grip on the spoon as it rotates or spins about the spindle or spin bearing. Thus, this invention includes changes in such interacting primary contact portions.

The apparatus of this invention has non-circular means on at least one of such primary contact portions to focus the engagement of the leading edge portion of the mounting hole and the spoon-engagement portion of attachment loop toward the centerpoint of such leading edge as the lure apparatus is drawn through water. Such "center-balanced" mount provides significant advantages.

The non-circular focusing means of this invention may take a variety of forms, but serves to substantially limit and control the lateral range of flutter and vibration. A tighter and stronger spinning occurs, with a stronger thump. Such stronger, more regular, and less erratic fluttering action is believed to more closely simulate the motion of natural baits.

As noted, the focusing means of this invention may take a variety of forms. In preferred forms of this invention, the focusing means includes a non-circular irregularity of the mounting hole substantially centered at the centerpoint of the leading edge.

Many different mounting hole shapes function successfully. In one embodiment of this invention, the leading edge portion of the mounting hole in the spoon is deltoid in shape. In another, the leading edge portion is ovate with the point of shortest radius substantially centered at the centerpoint of the leading edge. In still another, the leading edge portion is cordate, that is, is shaped like the narrower lower portion of the symmetrical heart symbol. In many preferred embodiments, the leading edge portion forms an acute angle.

In certain preferred embodiments, including many of those already described, the aforementioned irregularity includes the leading edge portion having a pair of edge portions which converge to a corner, either sharp or blunt, at the leading edge portion centerpoint. As noted, deltoid, ovate, and cordate shapes are among those which may be used. Acute angles are preferred.

In certain embodiments, the mounting hole has a substantially circular major portion and a minor portion projecting from the major portion in a direction toward the front end of the spoon, with the leading edge portion being along the mounting hole minor portion. A variety of shapes can be used for the such minor portion.

In some preferred embodiments, the rigid attachment loop has an edge with a pair of spaced edgepoints in contact with the leading edge portion of the mounting hole. The non-circular irregularity of the mounting hole is such that lines tangent to the mounting hole at the two edgepoints form an angle less than about 160 degrees. In such embodiments, points of the attachment loop between the edgepoints may or may not be spaced from contact with the mounting hole leading edge portion.

The sort of two-point contact between the attachment loop and the edge of the mounting hole in the spoon often occurs when the attachment loop is a clevis of the type often used in the prior art. Such clevis can have a flattened cross-section at its point of engagement with the edge of the mounting hole of the spoon. The clevis can be planar, with opposed first and second substantially planar surfaces.

The spoon-engagement portion of the inner edge of such clevis or other similar attachment loop may have an edge substantially straight in profile with two edgepoints, as described above, at the opposed planar surfaces contacting the leading edge portion of the mounting hole. As described above, the non-circular irregularity of the mounting hole is that lines tangent thereto at the two edgepoints form an angle less than about 160 degrees to each other.

In one preferred embodiment, the focusing means includes a gap in the leading edge extending to the front end of the spoon. Such gap is narrower than the attachment loop, allowing the spoon to stay on the loop, and may help to locate and focus the engagement of the loop and mounting hole to provide the above-mentioned advantages of this invention.

Certain embodiments of this invention which have such a gap utilize a clevis as the attachment loop, with such clevis preferably mounted on a spindle (usually a wire) which is narrower than the gap. The clevis has first and second leg portions with terminal structures pivotably attached to the spindle, the terminal structure of the first leg portion being small enough to pass through the mounting hole in the spoon. This serves to facilitate connection and disconnection of the spoon and clevis, by allowing the spoon to move over the spindle and onto the clevis. Attachment tools become completely unnecessary in such versions of the invention.

In certain of such embodiments, a restrictor tube is around the spindle in position between the two terminal structures. Such restrictor tube is wider than the gap such that the tube can block disconnection of the spoon from the clevis when such tube is in proper position. Such tube is also shorter than the spindle length which is between the terminal structures. The tube length is such that it can be slid on the spindle to a position exposing enough of the spindle to allow passage of the gap over it for disconnection of the spoon from the clevis.

In such versions of this invention, the mounting hole includes a main portion and a notch extending therefrom opposite the gap. Such notch is sized to receive a portion of the clevis during disconnection of the spoon from the clevis, to allow the gap to reach the spindle. This facilitates disconnection.

The aforementioned restrictor tube has first and second ends adjacent to the terminal structures of the first and second leg portions, respectively. In certain preferred embodiments, the engagement of the tube ends with their adjacent terminal structures varies to allow disconnection of spoon and clevis when the tube is moved along the spindle all the way in one direction but to block disconnection when the tube is moved all the way in the other direction. More specifically, when the first tube end engages its adjacent terminal structure there is insufficient clearance between the second tube end and its adjacent terminal structure to allow disconnection of the spoon. But when the second tube end engages its adjacent terminal structure there is sufficient clearance between the first tube end and its adjacent terminal structure to allow such disconnection.

Such variation is preferably provided by means of the configuration of the clevis. The second leg portion of the clevis may be angled away from the first leg portion such that engagement of the second tube end and the terminal structure of the second leg portion is a recessed engagement.

The improved fishing lure apparatus of this invention provides substantial advantages over the prior art.

During use, spoons tend to flutter and wobble less erratically, rotating instead with a stronger, more rhythmic vibration. This improved action is believed to significantly reduce the tendency of spinners to twist the fishing line, even light monofilament line. Furthermore, such improved action is believed to more accurately and reliably simulate the movements of natural aquatic creatures, a fact which tends to improve fish-attacting ability.

In addition, the gapped spoon version of this invention facilitates connection and disconnection of the spoon of this invention from the clevis or other attachment loop. No tools are required either for connection or disconnection. And, certain highly preferred embodiments allow such ease of connection and disconnection without substantial risk that the spoon will accidently fall away from the clevis during fishing.

This invention is applicable to various types of fishing lures having spoons, including spinners, spinnerbaits, jig spinners, and wobblers.

BRIEF DESCRIPTION OF THE DRAWINGS

FIG. 9 is an enlarged perspective view of the wire keel-spindle construction of FIG. 1, with other parts of the fishing lure apparatus, except the clevis, removed for clarity of illustration.

FIG. 10 is an exploded side elevation of another complete fishing lure apparatus in accordance with this invention, including a weighted keel and preferred spinner spoon.

FIG. 11 is an enlarged fragmentary side elevation of a wire keel construction in accordance with the prior art.

DETAILED DESCRIPTION OF PREFERRED EMBODIMENTS

Figure 1:
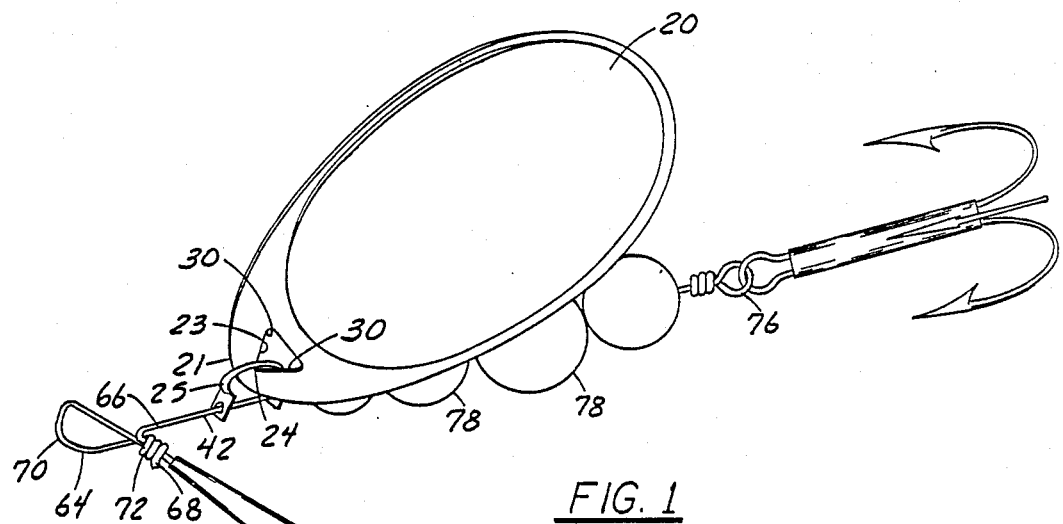
FIG. 1 is a perspective view of a preferred fishing lure apparatus in accordance with this invention.
Figures 2, 3:
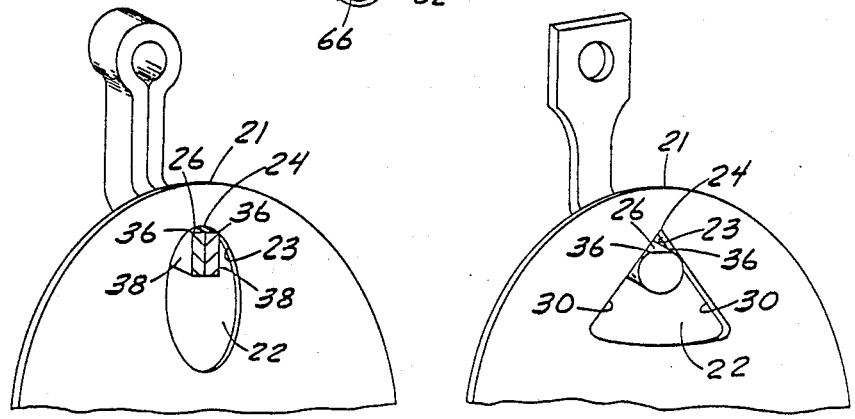
FIG. 2 is an enlarged fragmentary perspective view of the spoon and clevis of FIG. 1.
FIGS. 3–7 are similar perspective views of other preferred spoon-clevis combinations.
Figure 12:
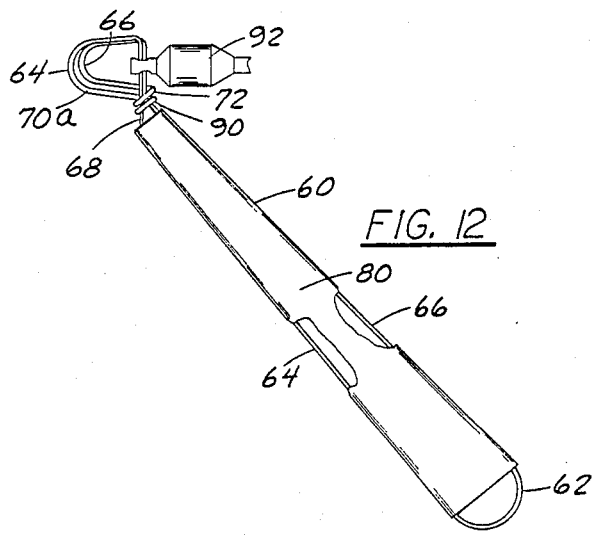
FIG. 12 is a side elevation of a variation of the improved keel construction.

The figures illustrate several embodiments of the fishing lure apparatus of this invention. FIGS. 1 and 10 show complete fishing lures, each including a unique wire keel-spindle construction and a unique spoon-clevis interengagement. FIGS. 2–8B illustrate variations of the unique spoon-clevis interengagement. FIG. 9 shows more detail on the keel-spindle construction, and FIG. 12 shows a variation in the unique keel construction. Throughout the drawings, similar elements and parts are identified by the same numerals.

Each spoon 20 has a front end 21 and a mounting hole 22 adjacent thereto. Mounting hole 22 has a leading edge portion 23 and leading edge centerpoint 24 both toward front end 21. Spoons 20 are each mounted on a generally rigid attachment loop which in each case is a clevis 25. Each clevis 25 extends loosely through mounting hole 22 of spoon 20 and has an inner edge 26 which includes a spoon-engagement portion 28. Mounting holes 22 and their leading edges 23 of the several spoons 20 vary and will hereafter be described.

In each case, leading edge 23 is engaged by spoon-engagement portion 28 of inner edge 26 of clevis 25 while the fishing lure apparatus is pulled through the water as in trolling and in casting. Spoon-engagement portion 28 and leading edge portions 23 form primary contact portions of clevis 25 and spoon 20. In each case, non-circular means are included on at least one of the primary contact portions to focus clevis-spoon engagement on centerpoint 24 of mounting hole leading edge portion 23. The focusing means is a non-circular irregularity of mounting hole 22 substantially centered on centerpoint 24 of mounting hole leading edge 23.

Figure 4:
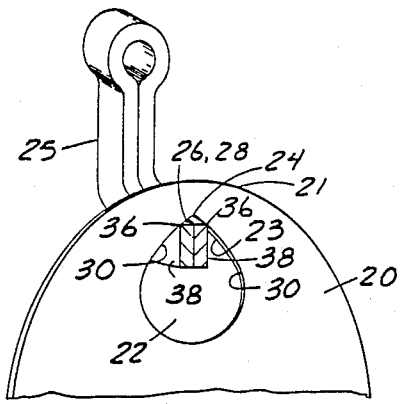
Figure 6:
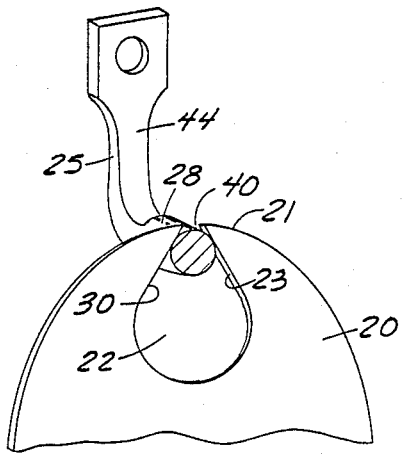
Figure 7:
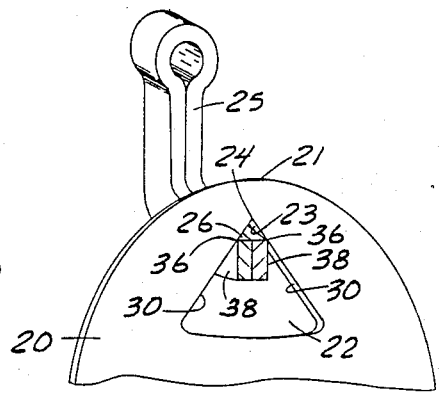

In FIGS. 1, 2, 7 and 10, and in FIGS. 4 and 6 as well, leading edge portion 23 is deltoid in shape. Each such leading edge portions tends to focus the engagement of spoon-engagement portion 28 at centerpoint 24 and resists easy lateral movement of clevis 25 away from centerpoint 24. Mounting hole 22 of FIG. 3 is ovate in shape with the portion of shortest radius substantially centered at centerpoint 24. As with the deltoid leading edge portions the leading edge portion tends to focus spoon-engagement portion 28 at centerpoint 24. Leading edge portion 23 of spoon mounting hole 22 in FIG. 4 is cordate in shape, that is, shaped like the point end of the heart symbol. The focusing of spoon-engagement portion 28 in such cordate leading edge is apparent.

Each deltoid leading edge portion described above forms an acute angle to serve as means to focus the engagement of clevis 25 in mounting hole 22. Such acute angles are one highly preferred focusing means. The obtuse angling shown in the embodiment of FIG. 4 is also acceptable.

Leading edge portions 23 of spoons 20 in FIGS. 1–2, 4, 7 and 10 each have a pair of edge portions 30 which converge to a corner at centerpoint 24. In contrast, the mounting hole illustrated in FIG. 3 has a curved leading edge without any corner formation. Each form serves to focus the engagement of spoon and clevis and provide the necessary center-balancing which is missing from structures of the prior art.

Figure 5:
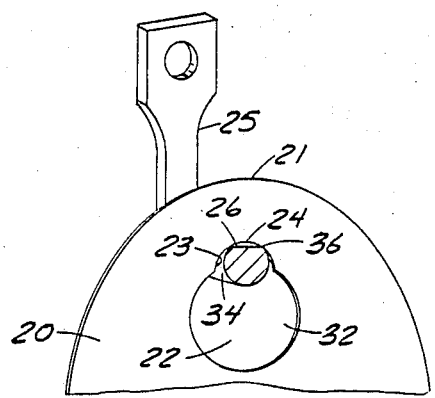

Mounting hole 22 in the spoon illustrated in FIG. 5 includes a circular major portion 32 and a minor portion 34 projecting from major portion 32 in a direction toward front end 21 of spoon 20. Leading edge portion 23 is along minor portion 34 of mounting hole 22. Minor portion 24 captures and positions spoon-engagement portion 28 of clevis inner edge 26 and tends to keep it focused at centerpoint 24.

As illustrated in FIGS. 2–5, and 7–8B, inner edge 26 of clevis 25 has a pair of edgepoints 36 in contact with leading edge portion 23 of mounting hole 22. The non-circular irregularity of mounting holes 22 in these embodiments is such that lines which are tangent to mounting hole 22 at edgepoints 36 form an angle less than about 160 degrees. Such angling serves to provide sufficient focus of spoon-engagement portion 28 of clevis 25 toward centerpoint 24 to serve the purposes of this invention.

In FIGS. 3, 4, 7, 8A and 8B, each clevis is planar, having opposed first and second planar surfaces 38. Inner edge 26 of each such clevis is substantially straight in cross-section with edgepoints 36 being formed at the intersection of inner edge 26 and planar surfaces 38. In contrast, the clevis shown in FIGS. 2 and 5 is circular in cross-section with a flattened inner edge 26.

Figure 8A:
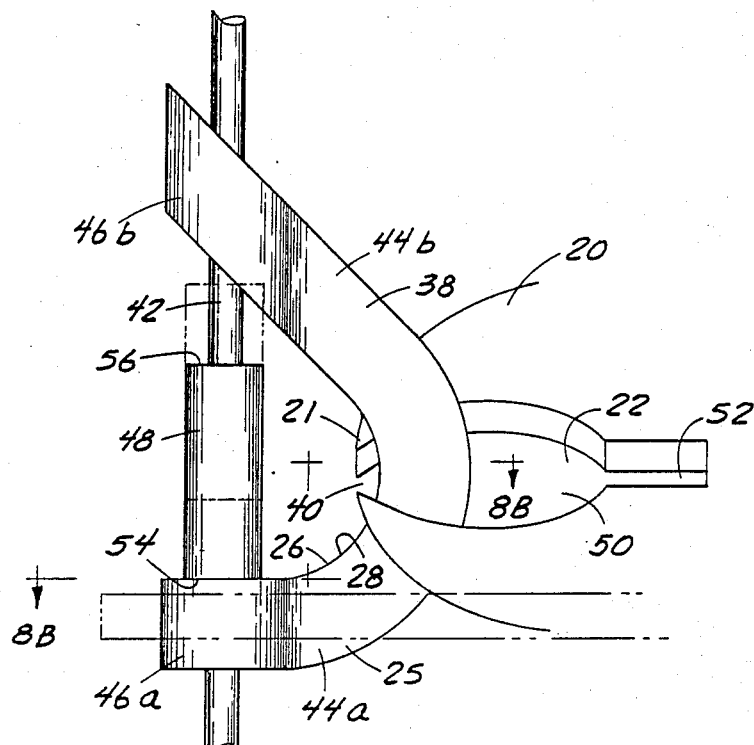
FIG. 8A is a greatly enlarged side elevation of another preferred spoon-and-clevis arrangement.
Figure 8B:
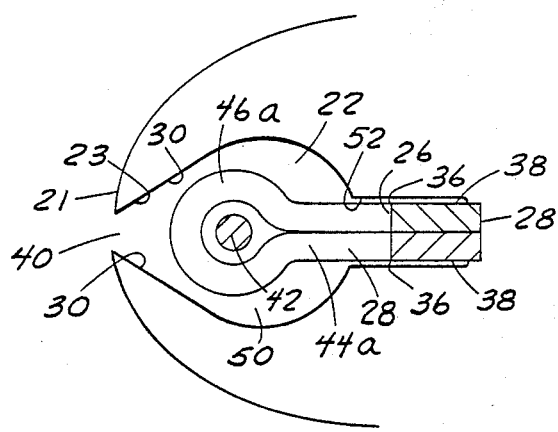
FIG. 8B is a top sectional view of the device of FIG. 8A, taken along section 8B—8B, with the restrictor tube raised and the spoon moved to a lower, laterally offset position for disconnection from the clevis.

The spoons shown in FIGS. 6, 8A and 8B have gaps 40 in their leading edges 23. Gaps 40 extend from leading edge 23 to front end 21. In each case, gap 40 is narrower than the clevis extending through mounting hole 22. Gaps 40 serve as means for focusing the engagement of spoon-engagement portion 28 at leading edge centerpoint 24. This dimensioning keeps spoon 20 from disconnecting from clevis 25 as the fishing lure apparatus is pulled through the water.

In each of the embodiments of FIGS. 6, 8A and 8B, the spindle 42, formed of wire, is narrower than gap 40. This allows disconnection of spoon 20 from clevis 25 to begin by moving it off the open end of clevis 25 until gap 40 passes over spindle 42. The remainder of the disconnection will be described after a more detailed description of the clevis structure.

Each clevis 25 illustrated in the drawings has first and second leg portions 44 with terminal structures 46 at their ends. Terminal structures 46 are each pivotably attached to spindle 42 such that the spoon-clevis combinations can spin around spindle 42. In the devices of FIGS. 6, 8A and 8B, terminal structures 46 are small enough to pass through mounting holes 22 in spoons 20. This allows disconnection of spoon 20 from clevis 25 to be completed, by moving spoon 20 beyond clevis 25 and from there over spindle 42 again to a position remote from the remainder of the apparatus.

The connection of each gapped spoon 20 with its clevis 25, in the embodiments of FIGS. 6, 8A and 8B, is carried out by reversing the disconnection operations just described. There is no need for tools for connection or disconnection. Thus, the spoons can readily be replaced with other gapped spoons.

FIGS. 8A and 8B are designed to avoid inadvertent disconnection of a spoon from its clevis. A restrictor tube 48 is around spindle 42 between terminal structures 46. Restrictor tube 48 is wider than gap 40 such that it blocks inadvertent disconnection of spoon 20. But tube 48 is shorter than the length of spindle between terminal structures 46 such that it can intentionally be slid on the spindle to a position exposing enough of spindle 42 to allow gap 40 to reach and pass over spindle 42.

Mounting hole 22 in the embodiment of FIGS. 8A and 8B includes a main portion 50 and a notch 52 extending from it opposite gap 40. Notch 52 is sized to receive a portion of clevis 25 in order that gap 40 may reach and pass over and exposed portion of spindle 42.

In the device of FIGS. 8A and 8B, restrictor tube 48 has first and second ends 54 and 56 which are adjacent to terminal structures 46a and 46b of first and second clevis leg portions 44a and 44b, respectively. The engagement of tube first end 54 with its adjacent terminal structure 46a is such that during such engagement there is insufficient clearance between tube second end 56 and its adjacent terminal structure 46b to allow spoon front end 21 and its gap 40 to reach spindle 42 for disconnection. However, the engagement of tube second end 56 with its adjacent terminal structure 46b is such that during such engagement there is sufficient clearance between tube first end 54 and its adjacent terminal structure 46a to allow spoon front end 21 and its gap 40 to reach spindle 42 for disconnection.

Such differing engagement characteristics of restrictor tube ends and terminal structures may be accomplished in various ways. In one preferred form, second leg portion 44b of clevis 25 is angled away from first leg portion 44a. This readily allows the engagement of tube second end 56 and its adjacent terminal structure 6b to be recessed, which in turn creates sufficient space for spoon removal just below tube first end 54.

FIGS. 1, 9, 10 and 12 illustrate a unique wire keel construction providing significant advantages over the prior art. While keels for fishing lure apparatus have been made of single wires in the past, the fabrication has typically been as illustrated in FIG. 11, which represents the prior art. The single wire keels of FIGS. 1, 9, 10 and 12 are completely different in configuration and construction.

In each of the devices illustrated in FIGS. 1, 9, 10 and 12, a keel 60 is formed by a unique single-wire configuration. The configurations of FIGS. 1, 9 and 10 will be described first, and then the variations in the configuration of FIG. 12 will be described.

Keel 60 is formed of a single wire doubled back on itself from a keel distal end 62 which divides the wire in first and second wire portions 64 and 66. First and second wire portions 64 and 66 are together at a keel proximal end 68 which is at the principal axis formed by spindle 42. First wire portion 64, which may be on either side of the keel, extends from keel proximal end 68 to form a line-attachment loop 70 at the end of spindle 42. Loop 70, of course, is used for attachment of fishing line. First wire portion 64 has a first end segment 72 returning from line-attachment loop 70. Such first end segment 72 is wound tightly, preferably with several turns, around first and second wire portions 64 and 66 at keel proximal end 68. This serves to support all portions of the single-wire configuration, including keel 60, firmly in their relative positions and prevent unraveling or distortion even during application of force as in fishing.

In the embodiments of FIGS. 1, 9 and 10, second wire portion 66 extends from keel proximal end 68 to form spindle 42, which defines and runs substantially straight along the principal axis of the lure. As illustrated in FIGS. 1, 9 and 10, clevis 25 is rotatably secured to spindle 42 for rotatable attachment of a spinner spoon 20 with respect to spindle 42. Second wire portion 66 extends further to provide a lure body mounting portion 74 and finally terminates in a hook-attachment loop 76.

As shown in FIGS. 1 and 10, body beads 78 may be threaded onto or otherwise attached to lure body mounting portion 74 of second wire portion 66, preferably at a position just behind clevis 25. The nature of such body beads or other body elements need not be described here since they form no part of this invention. Such parts, however, are typically chosen for their fish-attracting qualities.

The keel shown in FIG. 1, in addition to being formed of first and second wire portions 64 and 66 as described, has a plastic-sheet wrap around such wire portions to form a keel wall 80. This allows such keel to perform its function of avoiding or minimizing line twist problems.

The keel shown in FIG. 10 is a weighted keel, having three weights 82 which are brass beads or the like with passageways 84 through them. First and second wire portions 64 and 66 are both threaded through passageways 84 until they are drawn against a distal end loop 86, which is a part of the wire. A plastic shrink-wrap 88 covers weights 82 and holds them in place on first and second wire portions 64 and 66 and to complete formation of the keel. FIG. 10 also illustrates first and second wire portions 64 and 66 in phantom lines, as they would be before completion of the wire keel and spindle structure, in position for threading of weights 82 thereon FIG. 12 illustrates a variation of the improved single wire keel. In this device, second wire portion 66 extends with first wire portion 64 from keel proximal end 68 to form, with first wire portion 64, a two-strand line-attachment loop 70a. Second wire portion 66 has a second end segment 90 like first end segment 72 of first wire portion 64, which upon returning from loop 70a is wound with first end segment 72 around first and second wire portions 64 and 66 at keel proximal end 68.

In the configuration of FIG. 12, no spindle is formed. Instead, a standard swivel bearing 82 is attached to two-strand line-attachment loop 70a. The swivel bearing can be attached loosely as shown in the diagram or soldered to loop 70a, forming a rigid attachment. A rigid attachment loop can extend through swivel bearing 92 and be used for rotatable mounting of a spoon, preferably spoons of the type shown in the drawings.

The fishing lure apparatus described herein can be made using readily available parts and materials. Acceptable parts and materials would be apparent to those skilled in the art who become familiar with this invention. A preferred wire used for the keel and lure construction is a stainless steel spring wire with diameter of about 0.024 inch. Variations are possible, particularly for lures of particularly small or large size.

A great many changes may be made in several of the parts and elements described herein. A wide variety of spoons may be used in various embodiments of this invention, including wobbles, jigging spoons, and many others. A wide variety of attachment loops may be used in various embodiments of the invention including clevises (as shown), split rings, wire clips, snap clips, etc.

While the principles of this invention have been described in connection with specific embodiments, it should be understood clearly that these descriptions are made only by way of example and are not intended to limit the scope of the invention.

I claim:

1. In fishing lure apparatus of the type including a spoon, having a front end and a mounting hole with a leading edge portion and leading edge centerpoint toward the front end, and a substantially rigid loop with a spoon-engagement portion extending through the hole, the leading edge and spoon-engagement portions being primary contact portions of the spoon and loop, respectively, and the hole being sufficiently larger than the cross-section of the spoon-engagement portion of the loop to allow substantial freedom of relative movement of the spoon and loop, the improvement comprising the leading edge portion being formed by a pair of opposed, forwardly-extending, substantially symmetrical, non-circular edge lines converging toward the leading edge centerpoint to elongate the hole in a direction toward the centerpoint, whereby engagement of the loop is focused toward the centerpoint of the leading edge portion of the spoon as the lure apparatus is drawn through water.

2. The fishing lure apparatus of claim 1 wherein the leading edge portion is deltoid.

3. The fishing lure apparatus of claim 1 wherein the leading edge portion is ovate with the point of shortest radius substantially centered at the centerpoint of the leading edge.

4. The fishing lure apparatus of claim 1 wherein the leading edge portion is cordate.

5. The fishing lure apparatus of claim 1 wherein the leading edge portion forms an acute angle.

6. The fishing lure apparatus of claim 1 wherein the pair of opposed forwardly-extending non-circular lines converge to a corner at the leading edge portion centerpoint.

7. The fishing lure apparatus of claim 1 wherein the loop is a clevis.

8. The fishing lure apparatus of claim 1 wherein the focusing means includes a gap in the leading edge extending to the front end of the spoon, said gap being narrower than the attachment loop.

9. The fishing lure apparatus of claim 8 further comprising:
a spindle which is narrower than the gap; and
the attachment loop being a clevis having first and second leg portions with terminal structures pivotably attached to the spindle, the terminal structure of the first leg portion being small enough to pass through the mounting hole in the spoon,
thereby facilitating connection and disconnection of the spoon and clevis.

10. In fishing lure apparatus of the type including a spindle, a clevis having first and second leg portions with terminal structures pivotably attached to the spindle, a spoon having a front end and a mounting hole with a leading edge portion and leading edge centerpoint toward the front end, said clevis extending loosely through the mounting hole and having a spoon-engagement portion, the spoon-engagement and leading edge portions being primary contact portions of the clevis and spoon, respectively, the improvement comprising:
a gap in the mounting hole leading edge portion extending to the front end of the spoon, the gap being substantially centered at the centerpoint to focus clevis engagement on said centerpoint as the apparatus is drawn through water, said gap being narrower than the spoon-engagement portion of the clevis so that the spoon stays on the clevis while the primary contact portions are engaged;
said spindle being narrower than the gap;

the terminal structure of the first leg portion being small enough to pass through the mounting hole; and a restrictor tube around the spindle between the terminal structures, the tube being wider than the gap to block disconnection of the spoon from the clevis and shorter than the distance between the terminal structures such that it can be slid on the spindle to a position exposing enough of the spindle to allow passage of the gap thereover for disconnection of the spoon from the clevis.

11. The fishing lure apparatus of claim 10 wherein the mounting hole includes a main portion and a notch extending therefrom opposite the gap, said notch sized to receive a portion of the clevis to allow the gap to reach the spindle to facilitate disconnection of the spoon from the clevis.

12. The fishing lure apparatus of claim 10 wherein the tube has first and second ends adjacent to the terminal structures of the first and second leg portions, respectively, the engagement of the tube ends with their adjacent terminal structures being such that:

when the first tube end engages its adjacent terminal structure, there is insufficient clearance between the second tube end and its adjacent terminal structure to allow disconnection of the spoon, and when the second tube end engages its adjacent terminal structure, there is sufficient clearance between the first tube end and its adjacent terminal structure to allow such disconnection.

13. The fishing lure apparatus of claim 12 wherein the second leg portion is angled away from the first leg portion such that engagement of the second tube end and the terminal structure of the second leg portion is recessed.

14. The fishing lure apparatus of claim 13 wherein the mounting hole includes a main portion and a notch extending therefrom opposite the gap, said notch sized to receive a portion of the clevis to allow the gap to reach the spindle to facilitate disconnection of the spoon from the clevis.

* * * * *

UNITED STATES PATENT AND TRADEMARK OFFICE
CERTIFICATE OF CORRECTION

PATENT NO. : 4,885,866

DATED : December 12, 1989

INVENTOR(S) : Allen P. Vanderplow

It is certified that error appears in the above-identified patent and that said Letters Patent is hereby corrected as shown below:

Column 8, line 28, change "6b" to --46b--.

In claim 9, line 4, delete "attachment".

Signed and Sealed this

Sixteenth Day of October, 1990

Attest:

HARRY F. MANBECK, JR.

*Attesting Officer*      *Commissioner of Patents and Trademarks*